Dec. 7, 1965
E. K. FULLER
3,222,539
TRIGGER CIRCUIT
Filed March 4, 1960

INVENTOR
EVANDER K. FULLER
BY R. P. Miller
ATTORNEY

United States Patent Office 3,222,539

Patented Dec. 7, 1965

3,222,539

TRIGGER CIRCUIT

Evander K. Fuller, Greensboro, N.C., assignor to Western Electric Company, Incorporated, New York, N.Y., a corporation of New York Filed Mar. 4, 1960, Ser. No. 12,869

8 Claims. (Cl. 307—88.5)

This invention relates to a trigger circuit and more particularly to a transistor circuit for producing a trigger pulse at a precise point with respect to the origin of an input sine wave.

An object of this invention is to provide a new and improved trigger circuit.

Another object is the provision of a circuit responsive to an input sine wave to produce a trigger pulse at a predetermined point on the wave.

A further object of this invention is to provide a trigger circuit completely insensitive to amplitude variations of the input signal.

Still another object is the provision of a trigger circuit which requires no biasing power or synchronizing signal other than the input wave.

With these and other objects in view, the present invention contemplates a pair of transistors coupled together so that the application of a varying input signal results in the selective operation of the transistors to produce an output trigger pulse at a precise point with respect to the origin of the input signal. The applied signal is split into two out-of-phase components and applied to the first transistor whereupon the out-of-phase components bias the transistor into a state of conduction upon reaching suitable magnitude. The collector-to-emitter voltage increases when the increasing collector current begins to exceed the decreasing emitter current. When the collector-to-emitter voltage reaches a predetermined value, the second transistor is triggered to produce an output pulse together with a change in potential which is applied to render the first transistor non-conductive.

Figure 1:
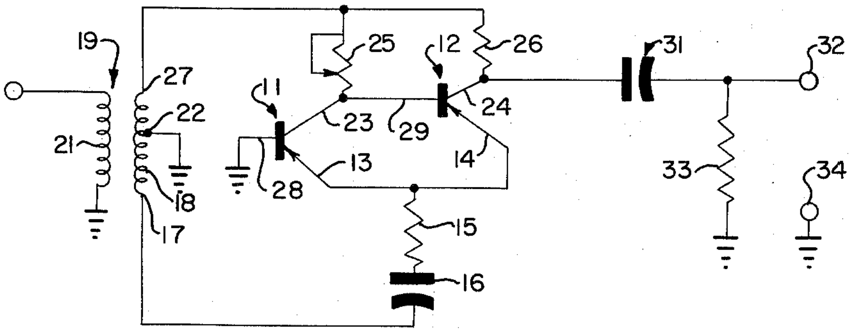
Figure 2:
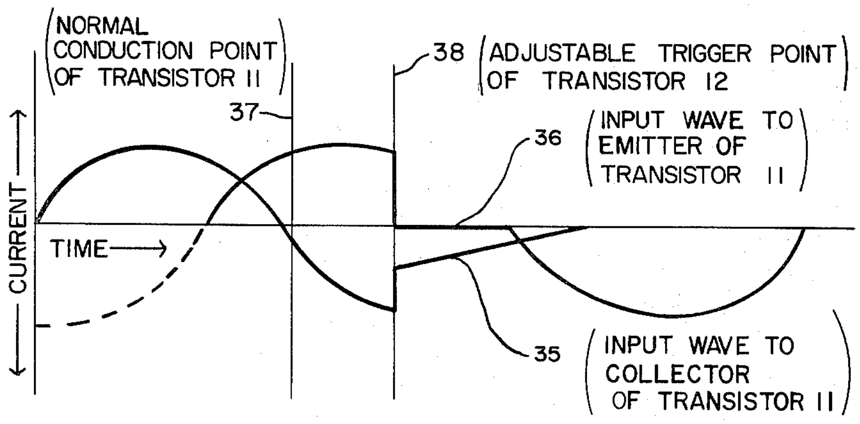

Other objects and advantages of the invention will become apparent by reference to the following detailed description when read in conjunction with the accompanying drawing wherein:

FIG. 1 is a schematic diagram of a phase responsive triggering circuit embodying the principles of the invention; and FIG. 2 is a wave form diagram illustrating conduction and trigger points of a pair of transistors with reference to a precise phase relation between collector and emitter currents of a first of the pair of transistors utilized in the circuit shown in FIG. 1.

There is shown in FIG. 1 transistors 11 and 12 of the PNP type with respective emitters 13 and 14 connected together and to a series RC arrangement of a resistor 15 and a capacitor 16 which is connected to one side 17 of a secondary winding 18 of a transformer 19. The transformer 19 includes a primary winding 21 on the input side with the secondary winding 18 having a center tap 22 directly connected to a ground potential on the output side.

Collectors 23 and 24 of the transistors 11 and 12 are connected through a variable resistor 25 and a fixed resistor 26, respectively, to another side 27 of the secondary winding 18 of the transformer 19. A base 28 of the transistor 11 is directly connected to the ground potential, whereas a base 29 of the transistor 12 is directly connected to the collector 23 of the transistor 11.

The collector 24 of the transistor 12 is also connected through a filtering capacitor 31 to an output terminal 32 with a load resistor 33 having one end connected to the output terminal 32 and the opposite extremity connected to the ground potential. A second output terminal 34 is also connected to ground potential.

Referring to FIG. 2, there are shown current waves 35 and 36 impressed on the collector 23 and the emitter 13, respectively, of the transistor 11. Also shown is a conduction point 37 of transistor 11 as well as a trigger point 38 which illustrates the precise phase point when the transistor 12 is triggered.

In the operation of the trigger circuit shown in FIG. 1, the transistors 11 and 12 are initially in the nonconducting state. As an input alternating current signal is applied to the primary winding 21 of the transformer 19, two sine wave signals 180 degrees out-of-phase appear, respectively, on each side of the center tap 22 of the secondary winding 18 of the transformer 19. The sine wave signal associated with the upper portion of the secondary winding 18 is applied to the collector 23 of the transistor 11 through the variable resistor 25 and to the collector 24 of the transistor 12 through the fixed resistor 26. The sine wave signal associated with the lower portion of the secondary winding 18 is applied to the emitters 13 and 14 of the transistors 11 and 12 through the series RC network consisting of the capacitor 16 and the resistor 15.

When the potential of the collector 23 is negative and the potential of emitter 13 is positive with respect to the potential of the base 28, the transistor 11 conducts in a normal manner. The normal point of conduction is illustrated graphically in FIG. 2 as conduction point 37. The emitter current wave 36 of FIG. 2 is normally lagging the collector current wave 35 by 180 degrees, but is advanced slightly in phase due to the RC combination of resistor 15 and capacitor 16, thereby maintaining the phase relationship illustrated in FIG. 2. Due to the phase advancement, the biasing current of the emitter 13 exceeds the current of the collector 23 thereby presenting a very low emitter-to-collector resistance. This low resistance prevents any appreciable voltage from appearing between the base 29 and the emitter 14 of the transistor 12 thereby biasing the transistor 12 to the nonconducting state. Thus the biasing power required for the circuit is obtained from the input alternating current signal.

When the collector current, which is adjustable in magnitude by resistor 25, of the transistor 11 exceeds the emitter biasing current, the precise phase degree point, shown as the trigger point 38 in FIG. 2, is attained thereby developing a substantial voltage between the collector 23 and the emitter 13. This potential is applied between the base 29 and the emitter 14 of the transistor 12 thereby allowing the transistor 12 to conduct. Therefore, the trigger circuit obtains not only the biasing power, but also the synchronization for operation from the single input alternating signal. Also, the increasing emitter-to-collector potential of transistor 11 from the previously low voltage condition presents the effect of a variable voltage means for the base-to-emitter circuit of transistor 12.

As the transistor 12 conducts, a surging current allows the collector 24 to approach a positive potential thereby causing the emitter 14 to rapidly approach a negative potential with respect to ground. However, the surging current lasts for a short duration. The negative going potential of the emitter 14 is fed back to the emitter 13 of the transistor 11 thereby placing the emitter 13 at a more negative potential than the base 28 and rendering the transistor 11 nonconductive. Resistor 25 now acts as a biasing element for controlling the current of the base 29.

Capacitor 31 offers a very low impedance to ground for the sudden transition in collector current of the transistor 12 while offering a very high impedance to the relatively slow sine wave. This allows a pulse of short duration to appear across the load developing resistor 33 as well as the output terminals 32 and 34.

When the potential of the collectors 23 and 24 becomes positive and that of the emitters 13 and 14 becomes negative with respect to ground, transistors 11 and 12 both operate in a reverse manner; that is, the emitters function as collectors and the collectors function as emitters. The combined reverse current through resistors 25 and 26 holds emitters 13 and 14 at approximately ground potential. This ground potential, maintained during the reverse operation of transistors 11 and 12, prevents a build up of charge on the capacitor 16 and automatically resets the trigger circuit for another cycle of operation.

Any amplitude changes on the input alternating current signal are applied to the collector 23 as well as the emitter 13 thereby allowing the circuit to be insensitive to amplitude variations appearing in the input signal.

By adjusting the ohmic value of resistor 25, the trigger point 38 of transistor 12, as shown in FIG. 2, can be varied slightly to allow the circuit to function at a different phase degree point from that which was previously selected. Also, the values of resistor 15 and capacitor 16 can be changed in order to shift the trigger point 38.

This circuit lends itself readily to all forms of phase measurements and measurements of components that produce phase shifts, as well as resistive components. The value of the component being measured would be converted into time very precisely and would be easily accessible for gating-type test circuits.

It should be understood that the above-described arrangement of circuit components and construction of elemental parts are simply illustrative of an application of the principles of the invention and many other modifications may be made without departing from the invention.

What is claimed is:

1. In a trigger circuit, a normally non-conductive transistor having an emitter, base, and collector, a source of varying signals for providing two components of substantially opposite phase relationship, means for applying said components to said emitter-base and collector-base, respectively to render said transistor conductive, and an emitter circuit including a series RC combination for advancing the phase of the emitter current such that a low emitter-to-collector potential is maintained for a predetermined time.

2. In a trigger circuit, a pair of normally non-conducting transistors each having an emitter, base, and collector, a source of varying signals for providing two components of substantially opposite phase relationship, means for applying said components to said emitter-base and collector-base, respectively of a first of said pair of transistors to render said first transistor conductive, means for applying an operating voltage to the second of a pair of transistors, means for advancing the phase of the emitter current of said first transistor such that a given emitter-to-collector potential is developed at a predetermined time, and conductor means coupling said emitter-to-collector potential to a second of said pair of transistors for rendering said second transistor conductive.

3. In a trigger circuit, a pair of normally non-conducting transistors, each having an emitter, base, and collector, a source of out-of-phase varying signals, means for applying said signals to said emitter-base and collector-base, respectively of a first of said pair of transistors to render said transistor conductive, a phase shifting means for developing a given emitter-to-collector potential at a predetermined time, means for applying an operating voltage to the second of a pair of transistors, means coupling said emitter-to-collector potential to the second of said pair of transistors for rendering said second transistor conductive, thereby developing an emitter potential on said second transistor which is fed back to the emitter of said first transistor to render said first transistor nonconductive.

4. In a trigger circuit, a first transistor having a base, an emitter and a collector, means for applying out-of-phase voltages to said collector-base and emitter-base, respectively to operate said first transistor, means for shifting the phase of the current flow through said first transistor whereby the emitter-collector voltage increases, a second transistor having a base, an emitter, and a collector, means for applying an operating voltage to the collector of said second transistor, and means for applying said increasing voltage to said base and emitter of said second transistor to operate said second transistor.

5. A trigger circuit comprising a first and a second transistor each having a base, an emitter and a collector electrode, a three terminal alternating current supply source having means for developing two out of phase components across the first and third terminals and across the second and third terminals, respectively an output network having a first and a second terminal, a variable resistor and a fixed resistor interconnected between a first terminal of said supply source and said collectors of said first and second transistors, a series RC network interconnected between a second terminal of said supply source and said emitters of said first and second transistors, means for connecting said base of said first transistor to a third terminal of said supply source, means for connecting said base of said second transistor to said collector of said first transistor, means for connecting said collector of said second transistor to said first terminal of said output network, and said second terminal of said output network connected to said third terminal of said supply source.

6. In a trigger circuit, a normally non-conductive transistor, a source of varying signal, means for resolving said signal into two out-of-phase components, means for shifting the phase of one of said components, and means responsive to said phase shift for rendering said transistor conductive.

7. In a trigger circuit, a normally non-conductive transistor having a base, emitter, and collector, an alternating voltage source, means for applying said operating voltage to said emitter-base and collector-base to operate said transistor, means for shifting the phase of the emitter current to develop a varying emitter-to-collector potential, and means responsive to said emitter-to-collector potential for rendering said transistor non-conductive at a predetermined magnitude of said potential.

8. In a trigger circuit, a first transistor having an emitter, base, and collector;

means for generating a varying voltage across the emitter-base and collector-base, respectively;

a phase-shifting means for developing a given emitter-to-collector potential at a predetermined time;

a second normally non-conductive transistor; and means for applying said varying voltage and the emitter-to-collector voltage of the first transistor to render the second transistor conductive at a predetermined amplitude of said varying voltage, thereby developing a negative approaching transistor potential which is fed back to the first transistor to render said transistor non-conductive.

References Cited by the Examiner

UNITED STATES PATENTS

| | | | |
|---|---|---|---|
| 2,568,099 | 9/1951 | Townsley | 328—28 |
| 2,915,636 | 12/1959 | Cluwen | 307—88.5 |
| 2,928,036 | 3/1960 | Walker | 307—88.5 |
| 2,929,940 | 3/1960 | Jones | 307—88.5 |
| 2,934,659 | 4/1960 | Abbott | 307—88.5 |
| 2,986,648 | 5/1961 | Willems et al. | 307—88.5 |
| 2,992,340 | 7/1961 | Floyd | 307—88.5 |
| 3,025,413 | 3/1962 | Borden | 307—88.5 |
| 3,033,998 | 5/1962 | Nellis | 307—88.5 |
| 3,075,090 | 1/1963 | Bregman | 307—88.5 |

OTHER REFERENCES

Proceedings of the IRE, October 1960, page 1775.

ARTHUR GAUSS, *Primary Examiner.*

GEORGE N. WESTBY, HERMAN KARL SAALBACH, *Examiners.*